(12) United States Patent
Haase et al.

(10) Patent No.: US 6,481,740 B1
(45) Date of Patent: Nov. 19, 2002

(54) BALL AND SOCKET TRAILER HITCH ASSEMBLY

(75) Inventors: Reinhold A. Haase, Hastings, NE (US); John D. Hull, Lincoln, NE (US); James M. Gruidel, Hastings, NE (US); Lynn D. Alber, Hastings, NE (US); Todd James Yost, Glenvil, NE (US); Thomas G. Johnson, Blue Hill, NE (US)

(73) Assignee: Dutton-Lainson Company, Hastings, NE (US)

( * ) Notice: Subject to any disclaimer, the term of this patent is extended or adjusted under 35 U.S.C. 154(b) by 0 days.

(21) Appl. No.: 09/977,121

(22) Filed: Oct. 12, 2001

(51) Int. Cl.[7] .............................................. B60D 1/173
(52) U.S. Cl. ....................................... 280/511; 280/512
(58) Field of Search .......................... 280/507, 511–513

(56) References Cited

U.S. PATENT DOCUMENTS 4,209,184 A * 6/1980 Byers ........................ 280/511
4,817,979 A * 4/1989 Goettker ..................... 280/512
5,573,263 A * 11/1996 Denny et al. ............... 280/512

* cited by examiner

Primary Examiner—Kevin Hurley
Assistant Examiner—Matthew Luby
(74) Attorney, Agent, or Firm—Banner & Witcoff, Ltd.

(57) ABSTRACT

A socket assembly for a trailer hitch includes a ball clamp member which has lateral arms or wings that limit the pivotal movement of the ball clamp member thereby improving the opportunity for the ball to properly fit in and totally seat within the cavity defined within the socket assembly.

12 Claims, 4 Drawing Sheets

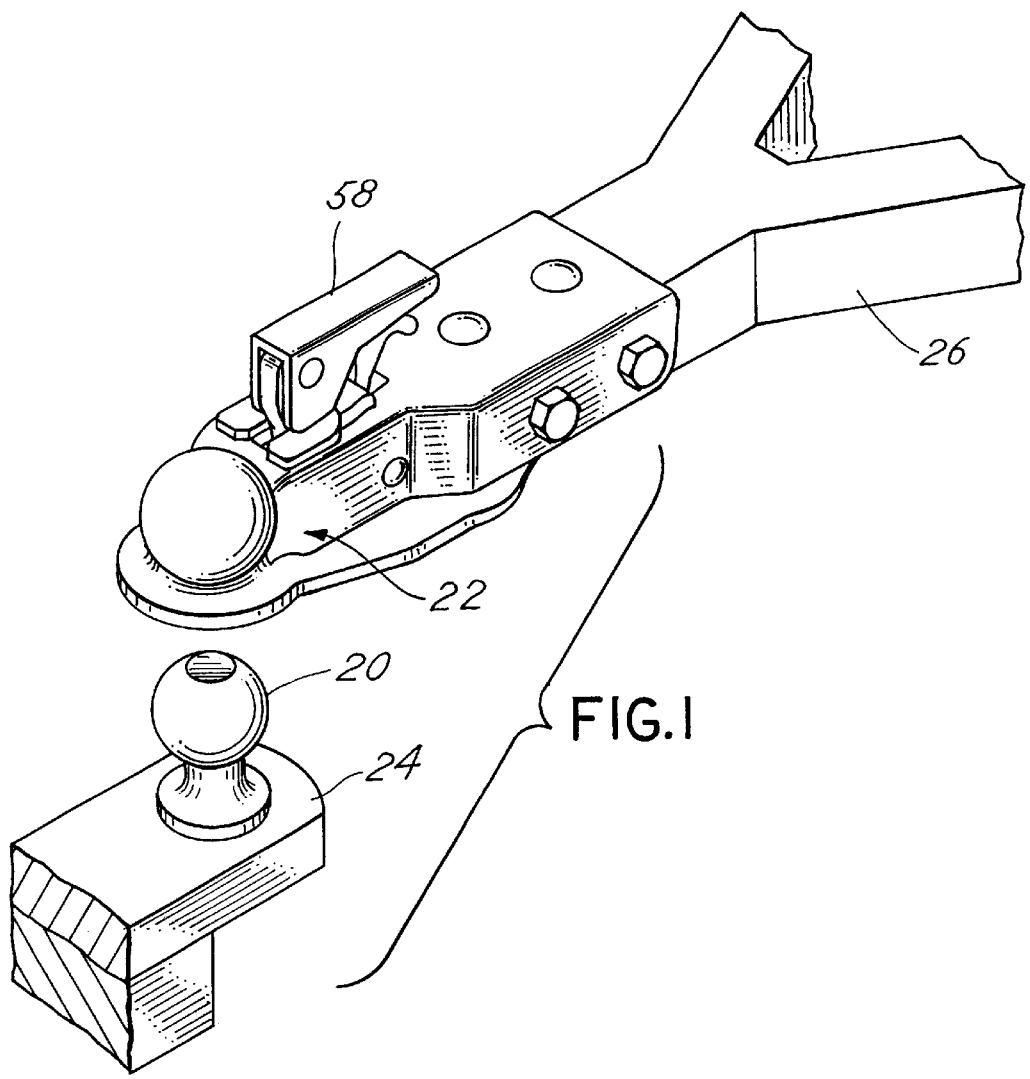
FIG.1
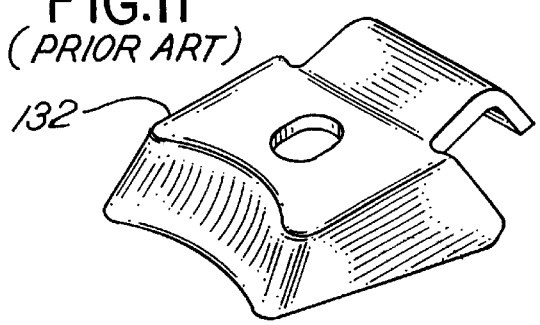
FIG.II
(PRIOR ART)

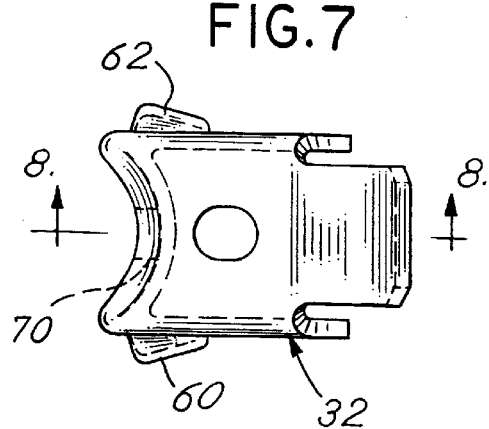
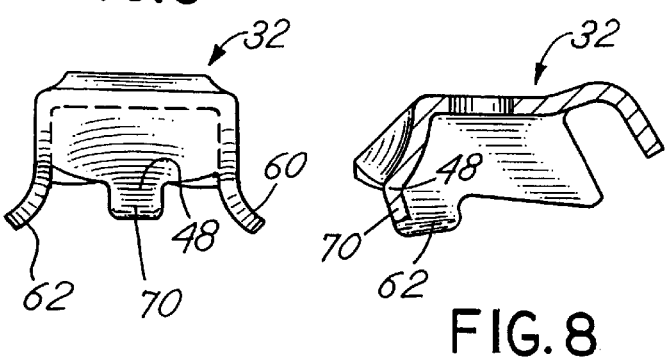
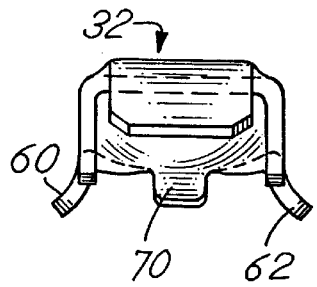

BALL AND SOCKET TRAILER HITCH ASSEMBLY

BACKGROUND OF THE INVENTION

In a principal aspect the present invention relates to a ball and socket trailer hitch assembly which incorporates a mechanism that facilitates the interlocking of a trailer ball with a socket hitch.

Trailer hitches are utilized to mechanically attach a trailer to a prime mover vehicle. For example, a boat may be placed on a trailer with a socket hitch assembly provided at the front end of the trailer. The socket hitch assembly may then be fitted over a ball mounted on the rear end of a sports utility vehicle, truck, or other vehicle. Typically the ball is generally spherical and is supported on a neck that is attached to a bumper of the vehicle, for example. The ball fits within a generally spherical cavity provided in the socket hitch component of the trailer hitch assembly. A ball clamp member is usually incorporated within the socket hitch component to clasp or engage the ball. An over center acting lever arm mounted on the hitch component may then be actuated to position the ball clamp member and thereby effectively lock the ball in the socket, the ball being retained by rib members of the ball clamp member and socket which fit under the ball in a manner which permits articulation and side to side rotation of the socket hitch component relative to the ball.

Of course, it is very desirable and preferably necessary to fully insert the ball in the socket hitch assembly, and ball and socket trailer hitches typically are designed to enable such complete insertion. On the other hand, in the event a trailer operator is negligent and not careful to engage in proper usage of a ball and socket trailer hitch, then possibly the ball will be only partially inserted into the hitch socket. If the trailer is loaded, such partial insertion may not be easily detected. As a consequence, the ball and socket components may be separated due to inappropriate driving conduct or for some other reason causing the socket to become disengaged from the ball. Thus, there has developed a desire for ball and socket trailer hitch designs that will enable users of such hitches to avoid negligent usage of the trailer hitch and vehicle, and will enhance the connection of a ball and socket trailer hitch assembly.

SUMMARY OF THE INVENTION

Briefly the present invention comprises a ball and socket trailer hitch assembly wherein the socket assembly includes a housing having a partially spherical cavity adapted to receive a ball. A pivotal clamp member is provided to engage and lock the ball in contact with the socket. The pivotal clamp member includes a ball retention rib as well as laterally projecting side wings which are designed to prevent undesired pivoting of the clamp member by the ball when the ball is inserted into the hitch housing socket cavity. The clamp member is thus designed to facilitate full insertion of the ball into the hitch socket in a manner which enables the hitch clamp member, in combination with the housing of the socket assembly, to securely surround and retain the ball within the socket assembly and, more particularly, within the cavity that receives the generally spherical ball. The clamp member thus fits under and around the ball member yet is held in a position by lateral wings in a manner which fosters proper alignment and engagement of the ball with the socket assembly thereby reducing the opportunity for negligent operation by the user of the trailer hitch.

Thus it is an object of the invention to provide an improved trailer hitch assembly.

It is a further object of the invention to provide a trailer hitch having a socket assembly comprised of a housing for receipt of a ball and a clamp member designed to securely engage a ball without expensive alteration or change in the construction of prior art ball and socket hitch assemblies.

Another object of the invention is to provide an improved ball and socket trailer hitch which is inexpensive, rugged, easy to use, and aesthetic.

These and other objects, advantages, and features of the invention will be set forth in the detailed description which follows.

DETAILED DESCRIPTION OF THE DRAWING

In the detailed description that follows reference will be made to the drawing comprised of the following figures:

FIG. 1 is an isometric view depicting a trailer hitch assembly comprised of a ball and socket assembly for receipt of the ball;

FIG. 7 is a top plan view of the ball clamp mechanism incorporated in the socket assembly of FIG. 4;

FIG. 8 is a cross sectional view of the ball clamp member of FIG. 7 taken along the line of 8—8;

FIG. 9 is an end view of the ball clamp member of FIG. 7;

FIG. 10 is an opposite end view of the ball clamp member of FIG. 7 opposite the end of FIG. 9; and FIG. 11 is an isometric view of the prior art ball clamp member typically incorporated as part of a socket assembly.

PREFERRED EMBODIMENT OF THE INVENTION

Figure 2:
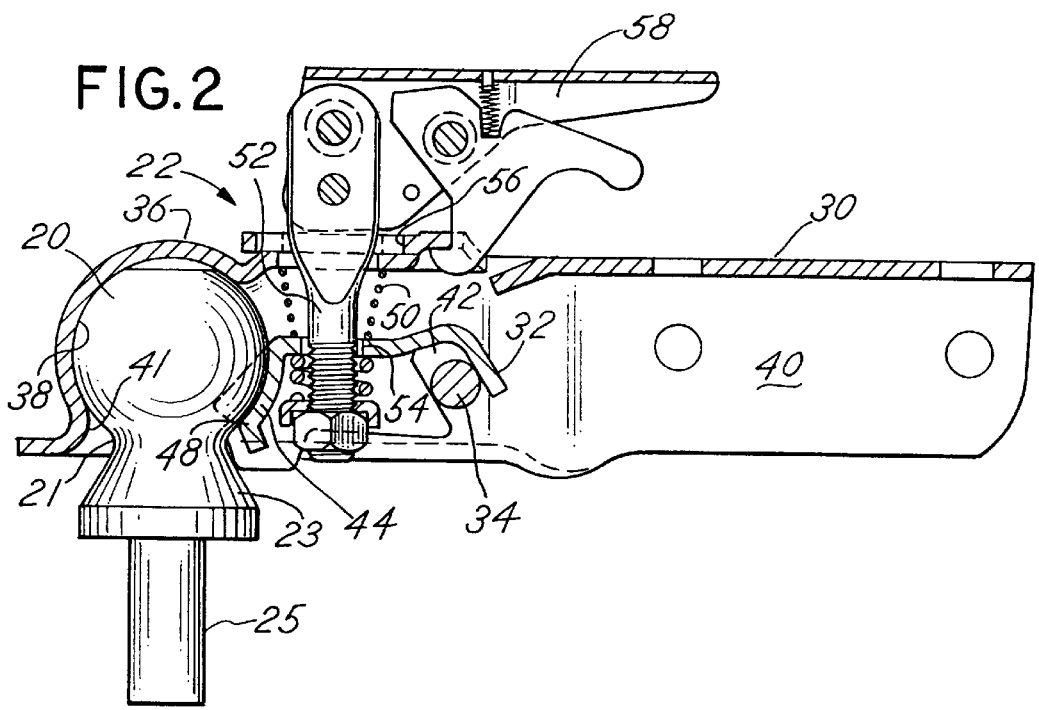
FIG. 2 is a cross sectional view of the trailer hitch assembly of FIG. 1 wherein the ball has been inserted fully into the socket assembly.

Referring to the drawing, the trailer hitch of the present invention is a ball and socket trailer hitch which includes a ball 20, that is designed to engage and be retained by a socket assembly 22. Typically the ball 20 is mounted on a vehicle bracket or the like 24, which is attached to the rear end of a truck, or sport utility vehicle, or the like. The construction of the ball 20 and the bracket 24 to which the ball 20 is attached is typical and known in the art.

The socket assembly 22 is typically attached to a vehicle that is to be towed, for example, a trailer 26. The socket assembly 22 is generally and substantially the same as those known in the prior art except for the improvement thereof that is associated with a ball clamp member which is incorporated as part of the socket assembly as described in greater detail below. Thus the invention is directed to an improved vehicle hitch ball clamp member alone and in combination with a socket assembly as well as the combination of a socket assembly and a ball.

FIG. 2 illustrates the improved construction of the present invention wherein a ball 20 has been inserted into and is retained by the socket assembly 22. The socket assembly 22 generally includes a housing 30 and a ball clamp member 32 which is pivotally and sidably mounted on a pin or rivet 34 mounted within the housing 30. Thus the housing 30, that is typically formed from sheet metal, comprises an elongated channel having a forward, formed generally partially spherical cavity 36 with a generally partially spherical interior surface 38 for receipt of the spherically shaped ball 20.

The ball 20, of course, includes a neck 21 and a base 23 mounted on a stud 25 which is attached to a bumper, a bracket, or the like. The ball 20 thus fits within the cavity 36 defined by the housing 30 and is slidable against the surface 38 inasmuch as the configuration of the spherical ball 20 and the partially spherical interior surface 38 is substantially congruent.

The ball 20 is retained within the cavity 36 defined by the housing 30 by means of the ball clamp member 32. The housing 30 further includes an elongated recess 40 for receipt of the ball clamp member 32. The ball clamp member 32 includes a slot 42 into which the rivet or pin 34 slidably and pivotally is fitted. The ball clamp member 32 further includes a partially spherical section 44 which is congruent with or compatible with the ball 20 and which is positioned in an opposed relation to the cavity 36. Thus the ball 20 may easily fit within the cavity defined by the housing 30 in combination with the partial spherical cavity section 44 of clamp member 32. The housing 30 further includes a partially circumferential rib section 41 which cooperates with the ball 20 on the neck 21 to facilitate retention of the ball 20 within the cavity 36. In like fashion the ball clamp member 32 includes a formed rib 48 which in combination with the rib 41 serves to retain the ball 20 within the cavity 36. The ball clamp member 32 is biased counterclockwise as depicted in FIG. 2 by means of a coil spring 50 which is fitted around a pin 52 that extends through passages 54 in clamp member 32 and 56 in housing 30. A lever arm 58 coacts with the pin 52 so that upon pivoting of the lever arm 58 the clamp member 32 is either tightly held in position against the ball 20 or released so that it may easily pivot out of position thus enabling removal of the housing 30 from the ball 20.

The construction so far described is typical of ball and socket assembly hitch constructions. The present invention relates to improvements incorporated in the ball clamp member 32 adjacent rib 48. Those improvements are illustrated in greater detail in FIGS. 4, 5, 6, 7, 8, 9, and 10. Specifically the ball clamp member 32 includes a first laterally extending side wing 60 and a second laterally extending side wing 62. Wings 60, 62 extend on opposite sides, laterally from the ball clamp member 32. The side wings 60 and 62 are configured so that they will project outwardly from the ball clamp member 32 and restrict the rotational movement of the ball clamp member 32 about the pivot pin or pivot axis 34. In a preferred embodiment two wings 60 and 62 are provided, one on each of the opposite sides of the ball clamp member 32. In this manner the twisting rotational movement of the ball clamp member 32 is limited or restricted by engagement of the wings 60 and 62 with the side flanges 64 and 66 of the housing 30.

Figure 3:
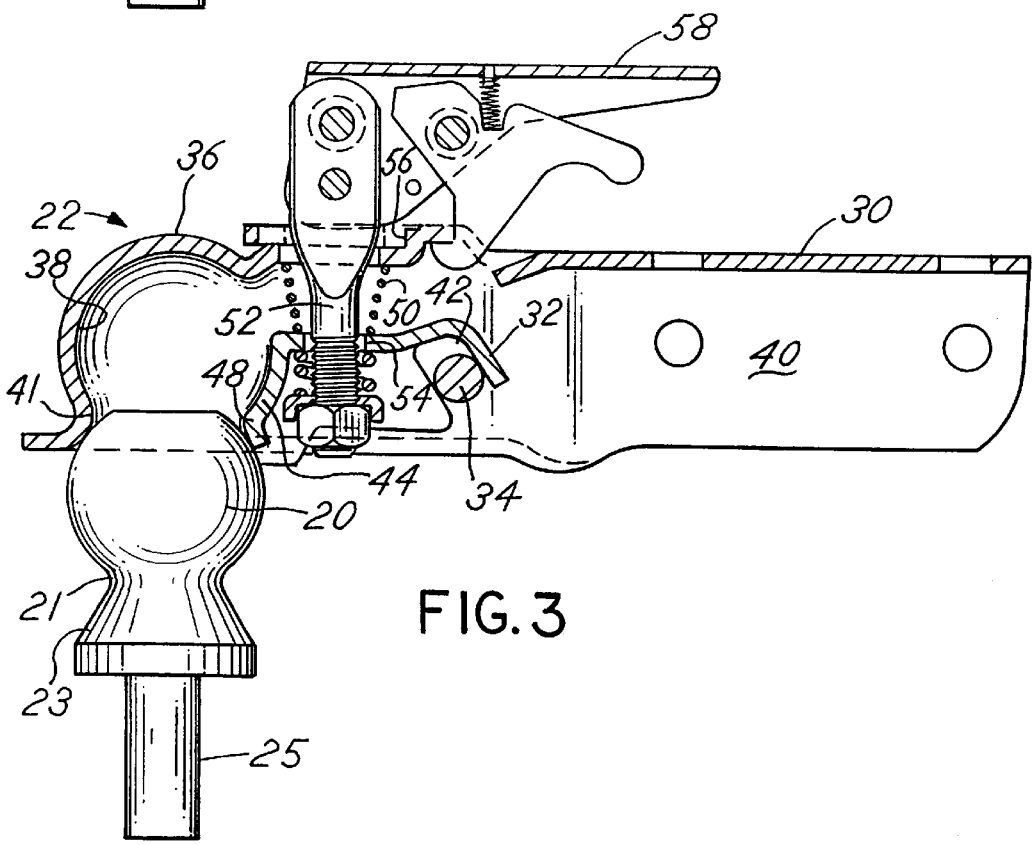
FIG. 3 is a cross sectional view similar to FIG. 2 wherein the ball is not fully inserted into the socket assembly.
Figure 4:
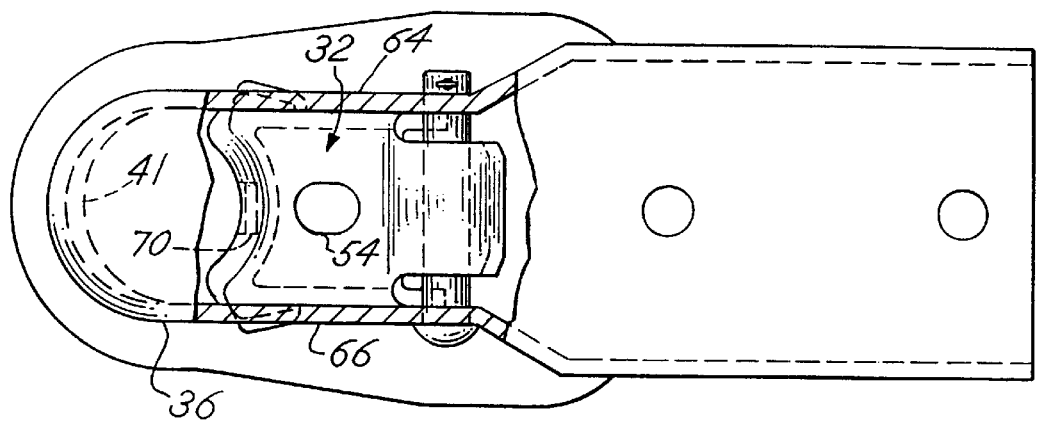
FIG. 4 is a top plan view of the socket assembly depicted in FIG. 3.
Figure 5:
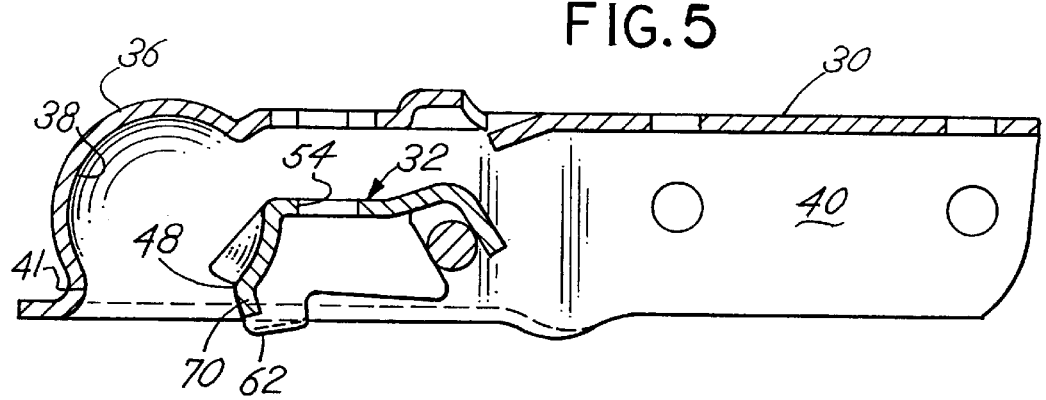
FIG. 5 is a cross sectional view of the socket assembly of FIG. 4 taken along the line of 5—5.
Figure 6:
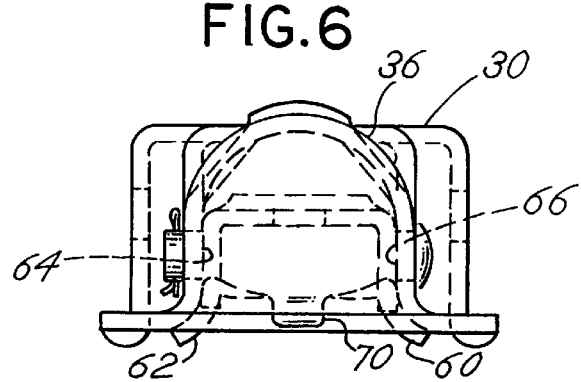
FIG. 6 is an end view of the socket assembly of FIG. 5.

As a further feature in combination with the wings 60 and 62 there is provided a rearwardly projecting tab 70 at the forward end or rib 48 of the clamp member 32. The purpose of the rearwardly projecting tab 70, which extends downwardly and toward the axis or rivet 34, is that it comprises part of the rib member 48 associated with the clamp member 32. Further it provides a means, in combination with wings 60, 62 for engaging the top side of ball 20 as depicted in FIG. 3 thereby preventing the ball 20 from being inserted a significant distance into the socket cavity 36. That is, the ball clamp member 32, when the ball clamp member 32 is in the position illustrated in FIG. 3, is positioned and restrained by wings 60, 62 thereby precluding or restricting movement of ball 20 into the cavity of housing 30. In this position the fact that the ball 20 has not fitted into the socket assembly is visually quite evident. Thus an operator of the hitch assembly will be able to physically and visually observe the fact that the socket assembly is not fitted over the ball 20. Further insertion of the ball 20 is then requisite by releasing the lever 58 so that clamp member 32 may properly pivot for full insertion of ball 20 into cavity 36.

As a result, in operation, the ball 20 cannot be compressed or fitted into the cavity 36 in a partially effective member. Rather the ball 20 must be fully fitted into the cavity 36 so that the ribs 41, 48 will retain the ball 20. Because of the design including the lateral wings 60 and 62 as well as the rearwardly extending tab 70, the ball 20 will not be fitted into the cavity 36 and it will be quite apparent that it is not fitted. Therefore, an operator of the trailer hitch of the present invention will be generally precluded and assisted in avoiding negligent coupling of the trailer hitch components.

In contrast, the prior art is depicted in FIG. 11. As depicted in FIG. 11, the ball clamp member or mechanism 132 does not include projecting wings 60 and 62 or a tab 70. As a result the user of such a construction is not afforded the benefit of improvements associated with the present invention. That is member 132 does not include means to properly and continuously align the member 132 regardless of the position of the lever 58. The present invention helps facilitate the proper and total insertion of the ball 20 into the cavity 36 of the socket assembly.

Other design options particularly with respect to the clamp member 32 may be adopted in order to limit the rotational movement of that clamp member 32 into the cavity 36 designed into the housing 30 and thereby insure that the trailer hitch ball 20 will fit within the socket assembly. The use of the single lateral tab 60 for example is possible. Elimination of the downwardly and rearwardly depending tab 70 is also possible without departing from the spirit and scope of the invention. The shapes of the various tabs and wings may also be varied as may their orientation. The parts may be reversed in some fashion so that wings 60, 62 may be incorporated on the housing 30 for engaging and limiting the movement of the clamp member 32. Interacting stops associated with the clamp member 32 and the housing 30 are also possible. Thus the invention is to be limited only by the following claims and equivalents thereof.

What is claimed is:

1. A socket assembly for a trailer hitch comprising a ball with a neck and a socket assembly for receiving a ball, said socket assembly comprising, in combination:

a housing including a partial, generally spherical cavity defining a first ball engaging surface and a ball insert passage including a partially circumferential retaining rib, said passage formed to receive and retain a spherical ball engaging the retaining rib with said spherical ball, said housing further including a recess adjacent the cavity; and a ball clamp member mounted pivotally in the housing recess for pivoting about an axis, said ball clamp member including a second partially spherical, ball engaging surface, said ball clamp member pivotally mounted with the second ball engaging surface in opposed relation to the first surface and pivotal about the axis into and away from the cavity, said ball clamp member including a retention rib positioned in combination with the housing retention rib to engage the ball to securely hold the ball in the cavity, said clamp member further including first and second lateral wings extending in opposite directions from the clamp member generally parallel to the pivot axis of the clamp member for engaging the housing upon pivotal movement of the clamp member into the cavity to limit pivotal movement of the clamp member about the axis into the cavity whereby a ball is prevented from partially seating in the cavity by undesirably pivoting the ball clamp into the cavity beyond a position limited by the wing.

2. The trailer hitch of claim 1 further including a depending tab from the clamp member from the retention rib for engaging the surface of a ball to restrict movement of a ball into the cavity when the clamp member is pivoted about the axis into the cavity.

3. The trailer hitch of claim 1 in combination with a generally spherical ball on a support to define a neck.

4. The trailer hitch of claim 1 wherein the ball clamp member includes a pivot slot for pivotally mounting the ball clamp member on a pivot pin attached to the housing whereby the position of the axis of rotation of the clamp member may be altered.

5. The trailer hitch of any of the preceding claims in combination with a clamp member locking mechanism.

6. The trailer hitch of claim 1 including means for biasing the clamp member about the pivot axis away from the housing cavity.

7. A socket assembly for a trailer hitch comprising a ball with a neck and a socket assembly for receiving a ball, said socket assembly comprising, in combination:

a housing including a partial, generally spherical cavity defining a first ball engaging surface and a ball insert passage including a partially circumferential retaining rib, said passage formed to receive and retain a spherical ball engaging the retaining rib with said spherical ball, said housing further including a recess adjacent the cavity; and a ball clamp member mounted pivotally in the housing recess for pivoting about an axis, said ball clamp member including a second partially spherical, ball engaging surface, said ball clamp member pivotally mounted with the second ball engaging surface in opposed relation to the first surface and pivotal about the axis into and away from the cavity, said ball clamp member including a retention rib positioned in combination with the housing retention rib to engage the ball to securely hold the ball in the cavity, said clamp member further including first and second lateral wings extending in opposite directions from the clamp member generally parallel to the pivot axis of the clamp member for engaging the housing upon pivotal movement of the clamp member into the cavity to limit pivotal movement of the clamp member about the axis into the cavity whereby a ball is prevented from partially seating in the cavity by undesirably pivoting the ball clamp into the cavity beyond a position limited by the wing further including a depending tab from the clamp member from the retention rib for engaging the surface of a ball to restrict movement of a ball into the cavity when the clamp member is pivoted about the axis into the cavity.

8. The trailer hitch of claim 7 first and second lateral wings extending in opposite directions from the clamp member generally parallel to the pivot axis of the clamp member.

9. The trailer hitch of claim 8 in combination with a generally spherical ball on a support to define a neck.

10. The trailer hitch of claim 8 wherein the ball clamp member includes a pivot slot for pivotally mounting the ball clamp member on a pivot pin attached to the housing whereby the position of the axis of rotation of the clamp member may be altered.

11. The trailer hitch of any of the preceding claims in combination with a clamp member locking mechanism.

12. The trailer hitch of claim 8 including means for biasing the clamp member about the pivot axis away from the housing cavity.

\* \* \* \* \*